(12) United States Patent
Huang

(10) Patent No.: US 8,757,375 B2
(45) Date of Patent: Jun. 24, 2014

(54) SUPPORT FOR A TABLET COMPUTER WITH A FUNCTION OF RECEIVING BAG

(76) Inventor: Feng-Dun Huang, Taipei Hsien (TW)

( * ) Notice: Subject to any disclaimer, the term of this patent is extended or adjusted under 35 U.S.C. 154(b) by 207 days.

(21) Appl. No.: 13/315,269

(22) Filed: Dec. 8, 2011

(65) Prior Publication Data
US 2013/0146482 A1 Jun. 13, 2013

(51) Int. Cl.
*B65D 85/00* (2006.01)
(52) U.S. Cl.
USPC ........................................ 206/320; 206/45.24
(58) Field of Classification Search
USPC ........... 206/45.23, 45.2, 45.24, 320, 736, 576
See application file for complete search history.

(56) References Cited

U.S. PATENT DOCUMENTS

| | | | | |
|---|---|---|---|---|
| 7,545,634 B2 * | 6/2009 | Simonian et al. | ........ | 361/679.55 |
| 7,775,355 B1 * | 8/2010 | Hood | ............................ | 206/320 |
| 8,281,924 B2 * | 10/2012 | Westrup | ........................ | 206/320 |
| 8,424,829 B2 * | 4/2013 | Lu et al. | ........................ | 248/371 |
| D687,438 S * | 8/2013 | Lu | ................ | D14/440 |
| D691,145 S * | 10/2013 | Nam-Su | ...................... | D14/440 |
| 2006/0285283 A1* | 12/2006 | Simonian et al. | ............. | 361/679 |
| 2011/0162987 A1* | 7/2011 | Bekele | ........................ | 206/320 |
| 2012/0181195 A1* | 7/2012 | Lu et al. | ........................ | 206/320 |
| 2012/0211613 A1* | 8/2012 | Yang et al. | ..................... | 248/174 |
| 2012/0305413 A1* | 12/2012 | Chung | ........................ | 206/45.23 |
| 2013/0020216 A1* | 1/2013 | Chiou | ........................ | 206/320 |
| 2013/0043148 A1* | 2/2013 | Chen et al. | ................. | 206/45.23 |
| 2013/0140203 A1* | 6/2013 | Chiang | ........................ | 206/320 |
| 2013/0284615 A1* | 10/2013 | Lee | ........................... | 206/45.23 |

* cited by examiner

*Primary Examiner* — Steven A. Reynolds

(57) ABSTRACT

A tablet computer supporting device with a function of receiving bag, wherein the present invention is not only as used for supporting an object, but also it can use as a receiving bag. The support has a face plate including a second plate (Y) at an upper side of the face plate and a support plate at a lower side thereof; a back plate being a bag. In combination of the face plate and the back plate, only a second plate of the face plate is secured to an upper portion of the upper plate of the back plate; and the bag in the back plate serves to receive an object; and the first plate is able to be bent to cover the second plate to be as a cover so that the bag can be carried easily.

5 Claims, 8 Drawing Sheets

SUPPORT FOR A TABLET COMPUTER WITH A FUNCTION OF RECEIVING BAG

FIELD OF THE INVENTION

The present invention relates to tablet computers, and in particular to a tablet computer supporting device with a function of receiving bag which has the function of supporting a tablet computer at a desired position, and receiving the computer therein.

BACKGROUND OF THE INVENTION

Tablet computers are a main trend in application of computers. The percentage of tablet computers over the computers is increased gradually. iPad Smart Cover is a kind of cover for protecting the screen of the iPad. The backside of the iPad is not covered by the iPad Smart Cover. However in many applications of the iPad, the tablet computer is needed to stand at a desired orientation for displaying. Generally, the user finds a supporter to support the tablet computer or take it at hand. However this is inconvenient for users. Although the Smart cover has the function of supporting an iPad to stand, the slopes of the iPad on the table are finite and the supporting function of the Smart cover is short and thus it is unsteadily.

Furthermore, if the iPad is not used, it is necessary to receive the iPad and other documents used with the iPad. As a result, the user must prepare another bag for receiving the iPad and others. This is inconvenient for the user.

Thus, there is an eager demand for a novel design which can resolve the prior art defects.

SUMMARY OF THE INVENTION

The object of the present invention is to provide a tablet computer supporting device with a function of receiving bag, wherein the present invention is not only used for supporting an object (for example, a tablet computer), but also it can be used as a receiving bag for receiving objects in the space between the front plate and the back plate.

To achieve above object, the present invention provides a support for a tablet computer with a function of receiving bag, comprising: a face plate (10) including a second plate (Y) at an upper side of the face plate and a support plate (20) at a lower side thereof; a back plate (12) being a bag; the back plate includes a bottom plate (101), a first plate (X), and an upper plate (102); the first plate being adhered upon an upper side of the bottom plate; the upper plate being arranged below the first plate; and a left edge, a right edge and a lower edge of the upper plate being adhered to a lower side of the bottom plate so as to form as a bag structure; wherein, in combination of the face plate (10) and the back plate (12), only the second plate is secured to an upper portion of the upper plate (102) of the back plate (12); and the bag in the back plate serves to receive an object; and the first plate is able to be bent to cover the second plate to be as a cover so that the bag can be carried easily.

DETAILED DESCRIPTION OF THE INVENTION

Figure 1A:
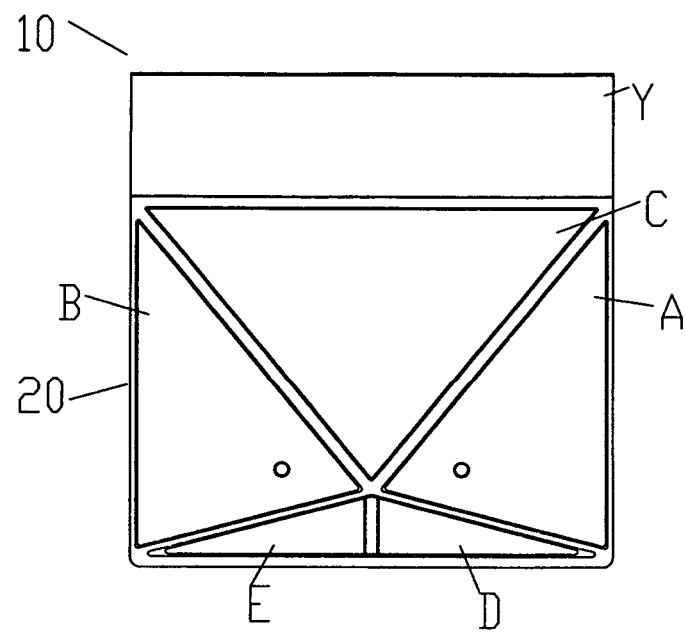
FIG. 1A is a schematic view of the first dividing way in the first embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The structure of the present invention showing the following elements of the present invention are illustrated with reference to the attached FIGS. 1A, 1B, 1C, 1D and 1E.

A face plate 10 includes a second plate Y at an upper side of the face plate 10 and a support plate 20 at a lower side of the face plate 10.

A back plate 12 has a form of a bag. The back plate 12 includes a bottom plate 101, a first plate X, and an upper plate 102. The first plate X is adhered upon an upper side of the bottom plate 101. The upper plate 102 is arranged below the first plate X. A left edge, a right edge and a lower edge of the upper plate 102 is adhered to a lower side of the bottom plate 101 so as to form as a bag structure.

Figure 2A:
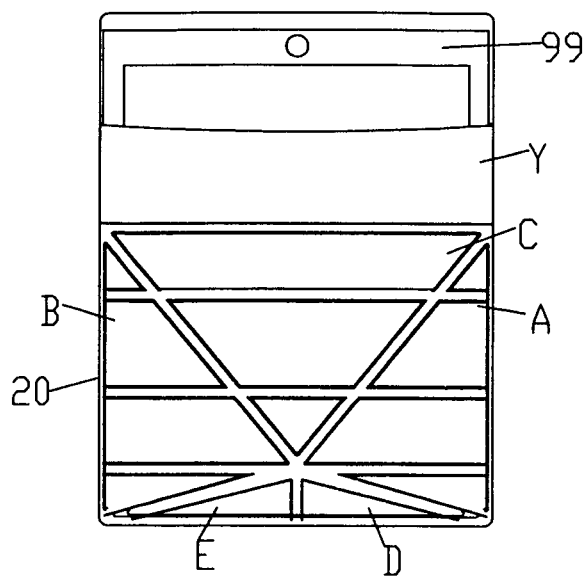
FIG. 2A and FIG. 2B show the applications of the first embodiment of the present invention.

See FIGS. 2A and 2E, in combination of the face plate 10 and the back plate 12, only the second plate Y. is secured to an upper portion of the upper plate 102 of the back plate 12.

Figure 2B:
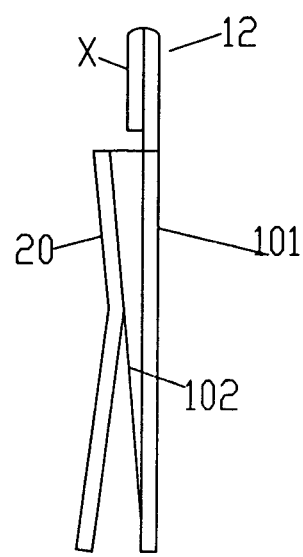

The bag in the back plate 12 serves to receive any object, in the present invention, it is mainly used to receive a tablet computer, or other related notebooks or papers, books, etc. Then the first plate X is bend to cover the second plate Y to be as a cover so that the bag can be carried easily (see FIGS. 2A and 2B).

The support plate 20 in the face plate 10 is preferably pivotably connected to the second plate Y and is preferably made of hard material.

The back plate 12 is preferably made of soft material. Defining the opening direction of the bag is a longitudinal direction, then a longitudinal length of the first plate X is shorter than the longitudinal length of the second plate Y (referring to FIG. 1C.

Figure 1B:
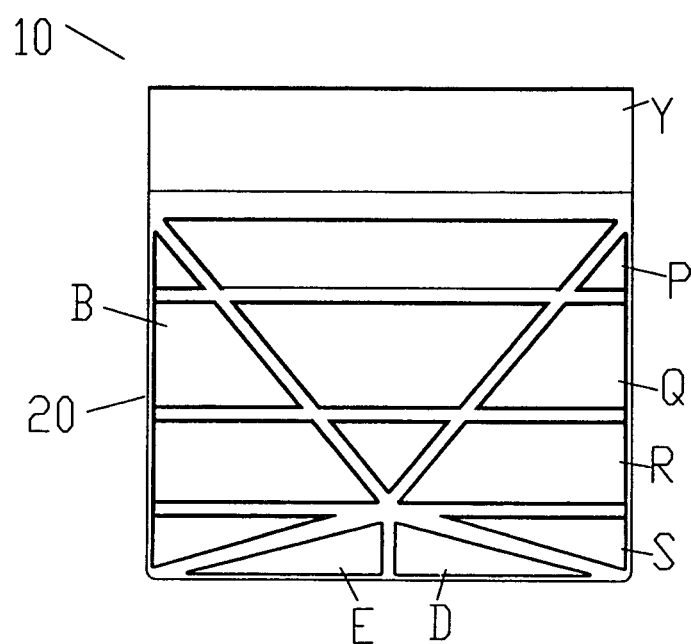
FIG. 1B is a schematic view of the second dividing way in the first embodiment of the present invention.
Figure 1C:
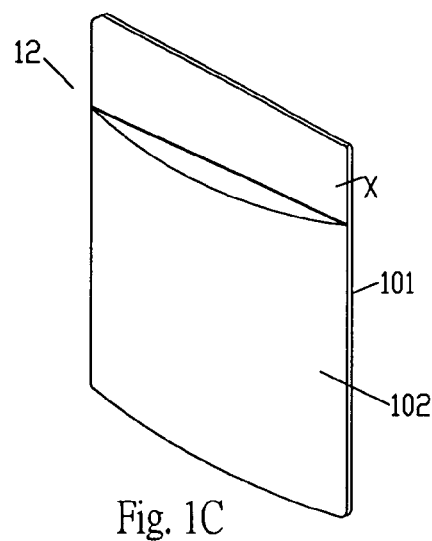
FIG. 1C is a schematic view of the back plate in the first embodiment of the present invention.
Figure 1D:
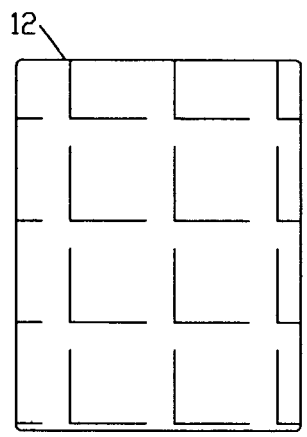
FIG. 1D is a schematic view of the back plate in the first embodiment, where an opposite side is illustrated.
Figure 1E:
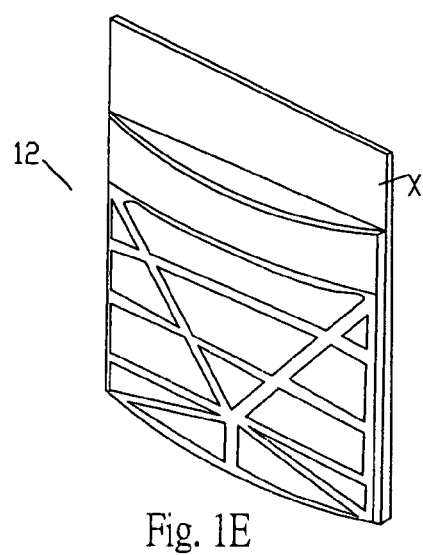
FIG. 1E is a perspective view of the back plate according to the first embodiment of the present invention.

See FIG. 1D, a back surface of the back plate 12 may be printed or adhered with patterns or drawings or textures to be as advertisement, or as a decoration.

As the first plate X is opened to cause the first plate X, the second plate Y and the support plate 20 are arranged longitudinally. Since as mentioned above, the longitudinal length of the first plate X is shorter than the longitudinal length of the second plate Y. When the first plate X is folded toward the second plate Y, a trench 123 (see FIGS. 2B and 3A) will be formed, while the support plate 20 can be folded to present with a 3D structure so that, see FIG. 4A, a tablet computer 99 can be plated in the trench 123 and is backed by the support plate 20. Then the table computer can stand on the second plate Y with a desired angle so that the user can view the computer screen with an easy view angle.

To cause the support plate 20 can stand uprightly, the support plate 20 can be divided into several hard sections which are connected by some soft connecting areas.

With reference to FIG. 1A, a first preferred embodiment about the division of the support plate 20 is illustrated.

In this embodiment, the support plate 20 is formed by three triangular sections A, B and C at an upper side and two triangular sections D and E at a lower side thereof. These triangular sections are connected flexibly so that the adjacent triangular sections are foldable to one another. The arrangement of these triangular sections is that a point near a lower side of the support plate 20 is radiated with 4 lines to the four corners of the front plate 10 so as to form with four triangular sections A, B C and "(combination triangular formed by D and E)", in that a triangular section C at an upper side and between the other two triangular sections A and B has a shape approximately equal to an isosceles triangle. The triangular sections "(combination of D and E)" near a lower side of the support plate 20 is further divided into two triangular sections D and E which are approximately identical to one another.

Figure 3A:
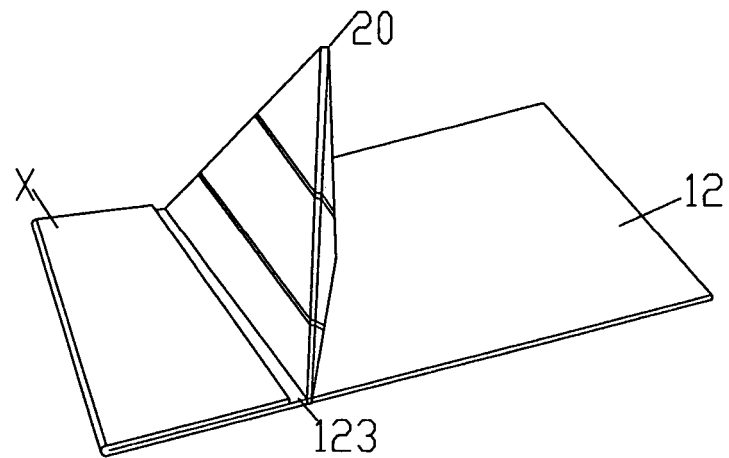
FIG. 3A shows the folding way in the first embodiment of the present invention.
Figure 4A:
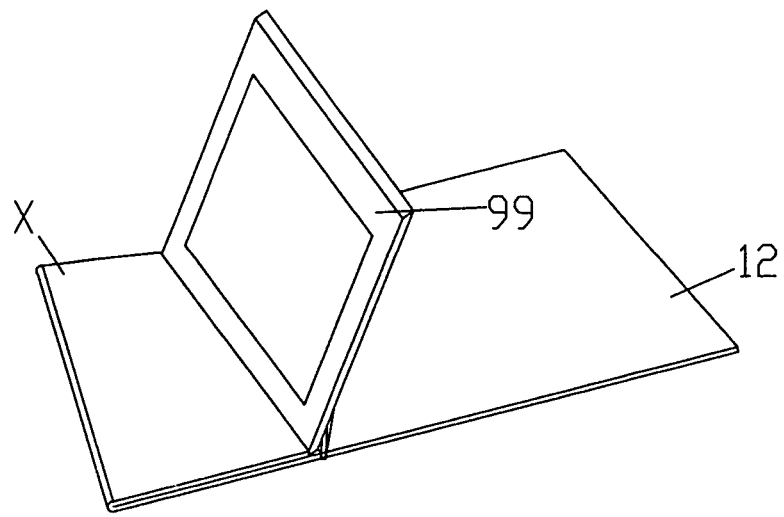
FIGS. 4A and 4B show the further applications of the first embodiment of the present invention.

FIG. 3A shows the use for the arrangement illustrated in FIG. 1A, in that the support plate 20 is folded along the sections shown in FIG. 1A, and thus the support plate 20 stands with a configuration shown in FIG. 3A.

Figure 4B:
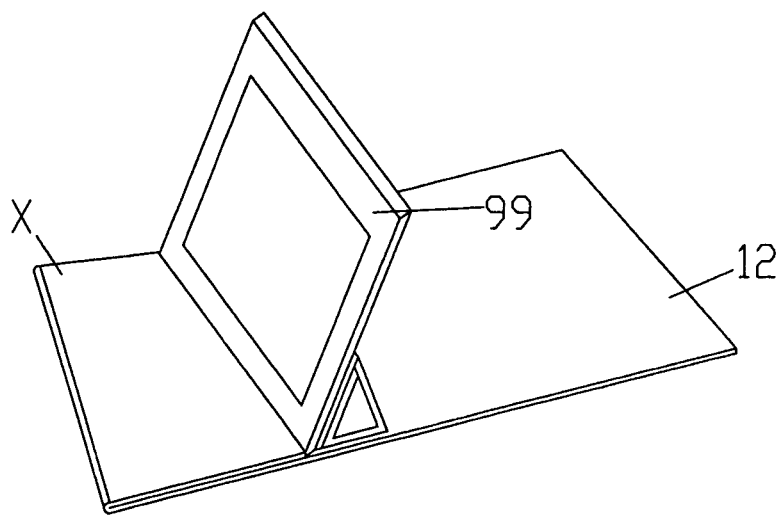

With reference to FIG. 1B, it is illustrated that in the arrangement shown in FIG. 3A, the support plate 20 is further divided into four parallel oblong sections P, Q, R, and S. These sections are combined flexible by the soft areas therebetween. FIG. 4B shows the use for the arrangement illustrated in FIG. 1B, in that the support plate 20 is folded as a triangular seat for supporting an object thereon.

Figure 3B:
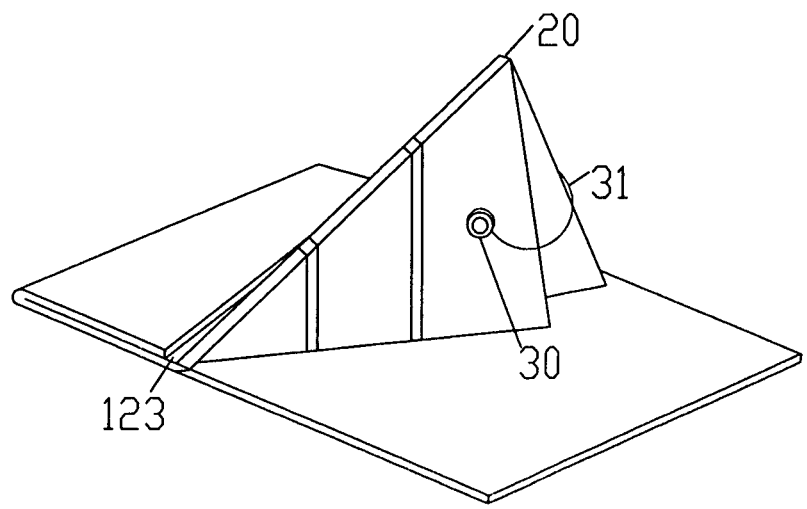
FIG. 3B shows another folding way in the first embodiment of the present invention.

See FIG. 3B, in the present invention, the two triangular sections A and B can be arranged with a buckle 30 and a connection strip 31 for tying to the buckle 30 so as to fix the folded support plate 20 at a desired position. Thus, the slope and height of the support plate 20 are controllable.

Figure 5A:
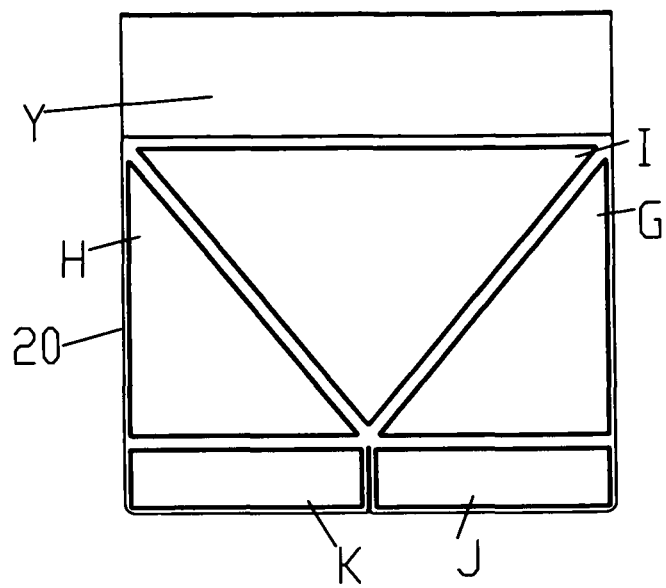
FIGS. 5A, 5B and 5C are different schematic views about the second embodiment of the present invention.

With reference to FIG. 5A, the second embodiment of the present invention is illustrated.

In this embodiment, the support plate 20 is formed by three triangular sections G, H and I at an upper side and two oblong sections J and K at a lower side thereof. These sections are connected flexibly so that the adjacent triangular sections are foldable to one another. The three triangular sections G, H and I include two right triangles G and H clamping an isosceles triangle I. A bottom of each right triangles G and H is adjacent to a corresponding oblong sections J and K. The areas between the different sections of the support plate 20 have weak structures so that they are folded to one another.

Figure 5B:
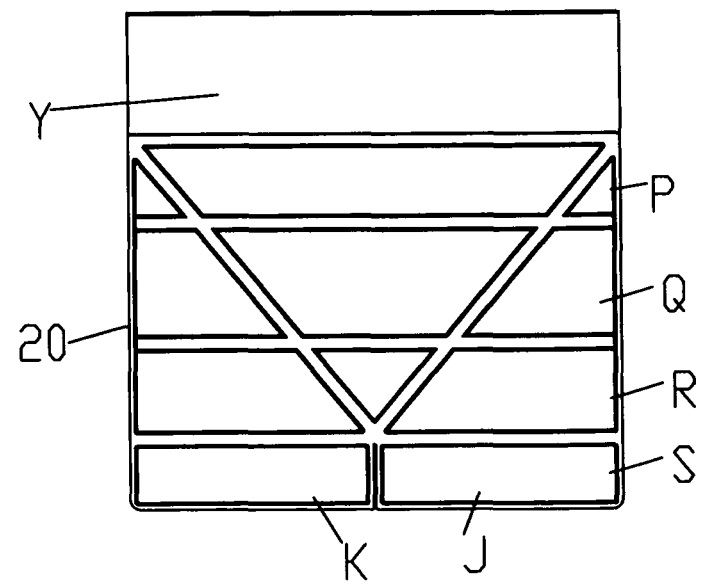
Figure 5C:
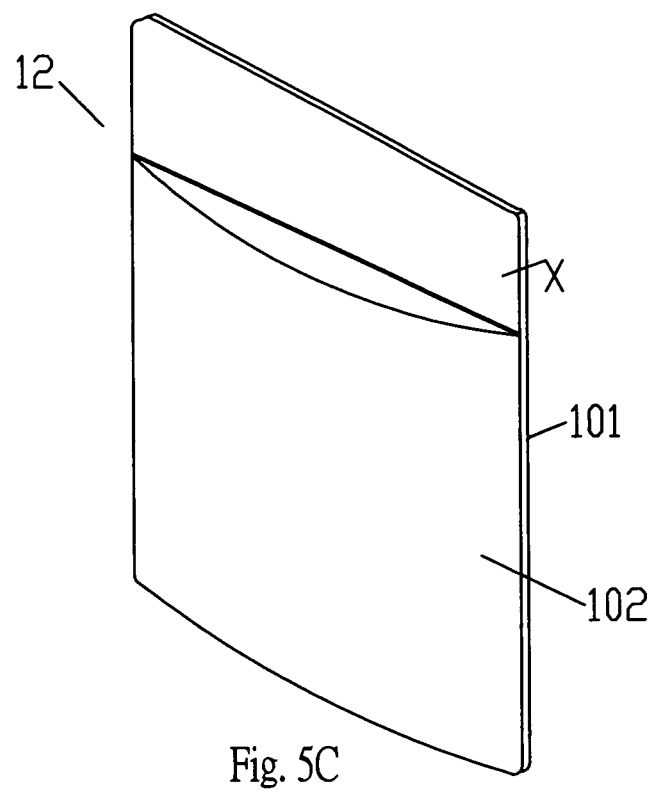
Figure 5D:
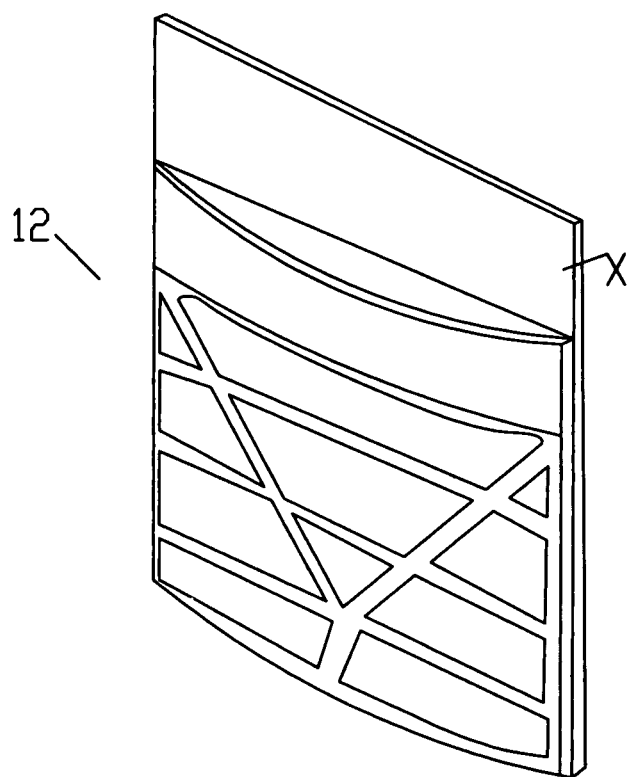
FIG. 5D is the perspective view of the second embodiment of the present invention.
Figure 6A:
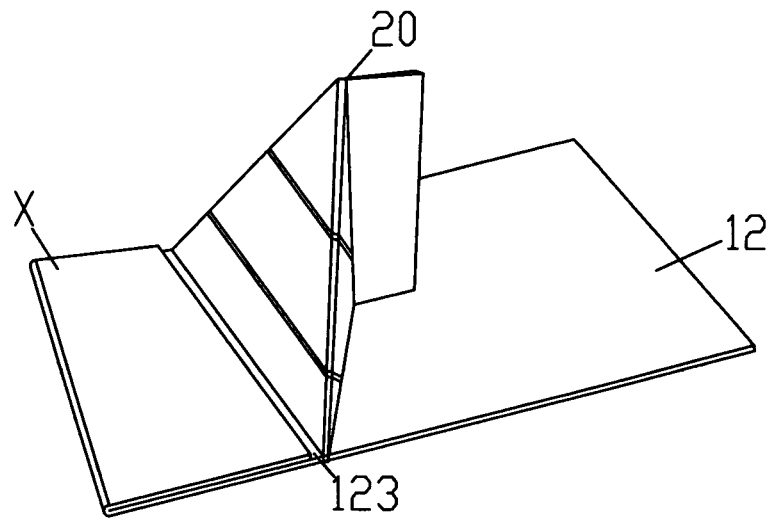
FIGS. 6A and 6B are folding ways in the second embodiment of the present invention.

FIGS. 5C and 5D show the use of this embodiment, as the support plate 20 is not stood, it can be used as a receiving bag, while as the support plate 20 is folded and stand on the face plate 10, a trench 123 is formed and the support plate 20 is used as a support (referring to FIG. 6A).

With reference to FIG. 6A, the folding of this case is that the support plate 20 is folded toward the second plate Y and the triangular sections G and H folded backwards. Then the two oblong sections J and K folded to one another.

Figure 6B:
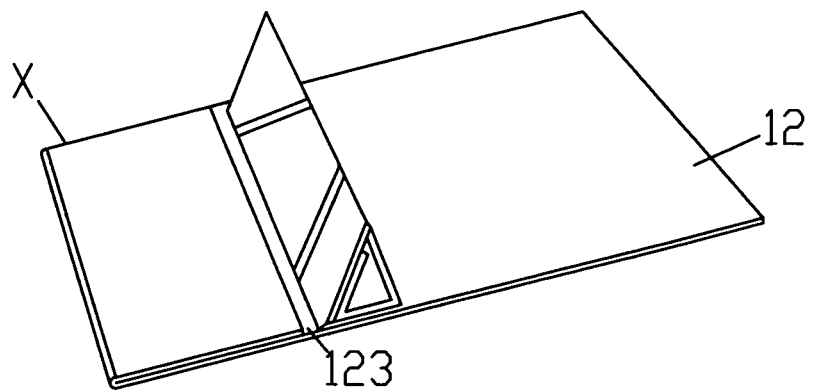

With reference to FIG. 5B, it is illustrated that in the arrangement shown in FIG. 5A, the support plate 20 is further divided into four parallel oblong sections P, Q, R, and S. These sections are combined flexible by the soft areas therebetween. FIG. 6B shows the use for the arrangement illustrated in FIG. 5B, in that the support plate 20 is folded as a triangular seat for supporting an object thereon.

Advantages of the present invention are that the present invention is not only used for supporting an object (for example, a tablet computer), but also it can be used as a receiving bag for receiving objects in the space between the front plate and the back plate. Furthermore, the different sections in the support plate cause that the folding of the support plate can make the whole structure stand and the angle for supporting the order is adjustable to a desire one. Furthermore, the support plate has two ways for folding so as to provide more selections to customers. No other supporting frame is needed. Thus the functions of the present invention are multiple and it can be operated conveniently to match the practical necessity.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A support for a tablet computer with a function of receiving bag, comprising:
   a back plate (12) being a bag; the back plate includes a bottom plate (101), a first plate (X), and an upper plate (102); the first plate being adhered upon an upper side of the bottom plate; the upper plate being arranged below the first plate; and a left edge, a right edge and a lower edge of the upper plate being adhered to the bottom plate so as to form as a bag structure;
   a face plate (10) including a second plate (Y) at an upper side of the face plate and a support plate (20) at a lower side thereof;
   wherein, in combination of the face plate (10) and the back plate (12), only the second plate is secured to an upper portion of the upper plate (102) of the back plate (12); and
   the bag in the back plate serves to receive an object; and the first plate is able to be bent to cover the second plate to be as a cover so that the bag can be carried easily; and
   wherein the support plate (20) is formed by three triangular sections (G, H and I) at an upper side and two shorter oblong sections (J and K) at a lower side thereof; these sections are connected flexibly so that the adjacent sections are foldable to one another; the three triangular sections (G, H and I) include two right triangles (G and H) clamping an isosceles triangle (I); a bottom of each right triangles (G and H) is adjacent to a corresponding shorter oblong sections (J and K); the areas between the different sections of the support plate (20) have weak structures so that they are folded to one another, and
   wherein the opening direction of the bag is defined as a longitudinal direction, then a longitudinal length of the first plate (X) is shorter than the longitudinal length of the second plate (Y);
   wherein when the first plate (X) is folded toward the second plate (Y), a trench (123) will be formed; and
   wherein the support plate is foldable to present with a 3D structure so that, a tablet computer (99) can be placed in the trench (123) and is backed by the support plate (20); then the table computer stands on the second plate with a desired angle.

2. The support for a tablet computer with a function of receiving bag as claimed in claim 1, wherein the support plate (20) in the face plate (10) is pivotably connected to the second plate and is made of hard material.

3. The support for a tablet computer with a function of receiving bag as claimed in claim 1, wherein the back plate is made of soft material.

4. The support for a tablet computer with a function of receiving bag as claimed in claim 1, wherein a back surface of the back plate is printed or adhered with patterns or drawings or textures to be as advertisement, or as a decoration.

5. The support for a tablet computer with a function of receiving bag as claimed in claim 1, wherein the support plate (20) is further divided into four parallel longer oblong sections (P, Q, R, and S); one of the lowest oblong section (S) contains the two shorter oblong sections (J, K); and these longer sections are combined flexible by the soft areas therebetween.

* * * * *